United States Patent
Wada

(10) Patent No.: US 6,463,423 B1
(45) Date of Patent: Oct. 8, 2002

(54) MULTI-WINNERS FEEDFORWARD NEURAL NETWORK

(75) Inventor: Yoshifusa Wada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/313,984

(22) Filed: May 19, 1999

(30) Foreign Application Priority Data

May 22, 1998 (JP) .......................................... 10-141493

(51) Int. Cl.[7] .............................................. G06F 9/445
(52) U.S. Cl. ...................................................... 706/15
(58) Field of Search .............................. 706/31, 20, 26, 706/27, 25, 19, 15

(56) References Cited

U.S. PATENT DOCUMENTS

| | | | | |
|---|---|---|---|---|
| 4,858,147 A | * | 8/1989 | Conwell | 706/19 |
| 5,058,184 A | * | 10/1991 | Fukushima | 706/31 |
| 5,255,348 A | * | 10/1993 | Nenov | 706/27 |
| 5,325,510 A | * | 6/1994 | Frazier | 706/10 |
| 5,355,435 A | * | 10/1994 | DeYoung et al. | 706/26 |
| 5,479,574 A | * | 12/1995 | Glier et al. | 706/25 |
| 5,487,133 A | * | 1/1996 | Park et al. | 706/20 |
| 5,532,938 A | * | 7/1996 | Kondo et al. | 708/524 |
| 5,572,689 A | * | 11/1996 | Gallup et al. | 712/200 |
| 5,600,846 A | * | 2/1997 | Gallup et al. | 712/5 |
| 5,822,742 A | * | 10/1998 | Alkon et al | 706/31 |

FOREIGN PATENT DOCUMENTS

| | | |
|---|---|---|
| JP | H6-161983 | 6/1994 |
| JP | H6-80505 | 10/1994 |

OTHER PUBLICATIONS

A Multi–Winners Self–Organizing Neural Network, Jiongtao Huang and Masafumi Hagiwara, Department of Electrical Engineering, Keio University, 1997 IEEE.*

(List continued on next page.)

Primary Examiner—Thomas Black
Assistant Examiner—Michael B. Holmes
(74) Attorney, Agent, or Firm—Sughrue Mion, PLLC

(57) ABSTRACT

A multi-winners feedforward neural network which is constituted while using neuron-elements consisting of the modified neural network, enables learning to be carried out autonomously regarding any problems, and is capable of being constituted by small number of LSI circuit simply. In the neural network which has a hierarchical structure consisting of one layer and/or a plurality of layers constituted by plural pieces of neurons, there is provided a controller for controlling the number of firing of the neurons, in which the number of firing of the neurons is more than two, in such a way that the number of firing of the neurons is restrained depending on a specified value and/or range of the specified value in every layer, thus preventing dissipation of the number of the neurons. The controller is a detection controller for causing a value to be the specified value and/or the range of the specified value, depending on obtained value while detecting power supply current supplied to the whole neurons in every layer. Otherwise, the controller is a number of firing detection neuron for detecting the number of firing of the neurons in every layer, thus causing value of output of the number of firing detection neuron to be the specified value and/or the range of the specified value.

20 Claims, 7 Drawing Sheets

OTHER PUBLICATIONS

Multinomial Conjunctoid Statistical Learning Machines, Yoshiyasu Takefuji, Robert Jannarone, Yong B. Cho, and Tatung Chen, Center for Machine Intelligence, Department of Electrical and Computer Engineering, Univeristy of South Carolina, 1988 IEEE.*

Electrical Power System Stability Assurance for the International Space Station, T.C. Wang, J.B. Raley, McDonnell Douglas Aerospace, $32^{nd}$ Intersociety Energy Conversion Engineering Conference, Jul. 27, 1997–Aug. 1, 1997.*

A Low Power Video Encoder with Power, Memory, and Bandwidth Scalability, Navin Chaddha and Mohan Vishwanath, $9^{th}$ International Conference on VLSI Design, Jan. 1996 IEEE.*

Computer search listing from www.google.com, terms: neural network . . . .*

A. Iwata et al., "Neural Network LSI", The Institute of Electronics, Information and Communication Engineers, (1996), pp. 1–105.

G. Huang et al., " A Self–Organizing Neural Network Using Multi–Winners Competitive Procedure", The Institute of Electronics, Information and Communication Engineers, (Technical Report of IEICE, NC 94–94, pp. 143–150 with English Abstract.

J. Huang et al., "Multi–Winners Self–Organizing Neural Network", The Institute of Electronics, Information and Communication Engineers, (Technical Report of IEICE, NC 96–156, pp. 7–14 with English Abstract.

* cited by examiner

F I G. 1
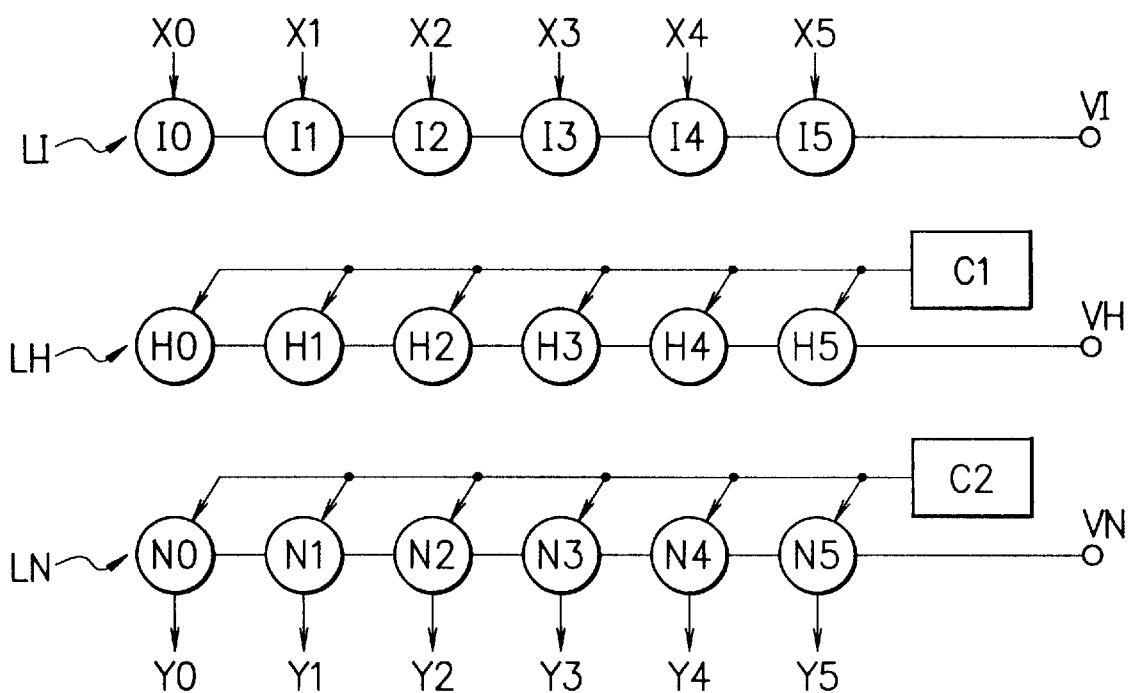

MULTI-WINNERS FEEDFORWARD NEURAL NETWORK

BACKGROUND OF THE INVENTION

The present invention relates to a multi-winners feedforward neural network. More to particularly this invention relates to a neural network which is used for a leaning type pattern recognition device such as character recognition, voice recognition, picture recognition and so forth.

DESCRIPTION OF THE PRIOR ART

All kinds of models are proposed as architecture for realizing neural network which is constructed by neuron-elements with learning function. Such the kinds of models are the perceptron, the recurrent type network, the Hopfield network, the Neo-cognitron, the error back-propagation method, the self-organizing map method, and so forth. The individual function of these models can be achieved by the technique of the analog or digital circuit, further, the individual function of these models can be achieved by the technique of the program in which function is described using the processor as the fundamental circuit. Furthermore, the individual function of these models can be achieved by the both techniques which are combined.

In the neural network system that the analog circuit is taken to be fundamentals, the neuron-element which processes input signal obtains the product-sum between a plurality of input signals and the weights with respect to individual input signal as the state-function of neurons. The product-sum is obtained by using an analog multiplier such as Gilbert amplifier and so forth, or an adder. The output of the product-sum is compared with a threshold value held by respective neuron-elements using a comparator. Then these results are processed in function transformation which is carried out according to the designated function such as Sigmoid function and so forth to output a result of processing of function transformation. Concretely, in "Analog VLSI and Neural System" by Carve Mead, 1989, or in "Neural Network LSI" by Atsushi Iwata and Yoshihito Amemiya, 1996 published by the Institute of Electronics, Information and Communication Engineers, above described techniques are described.

In the latter system that the processor circuit is fundamentals, all kinds of processing are described by the program. All kinds of processing such as the product-sum function of neurons, the comparison function of neurons, the function-transformation function of neurons and so forth are described by the program, thus being distributed to a plurality of processors to be calculated in parallel.

Furthermore, characteristic functions of a part of neuron-element such as the product-sum function, the pulse output function and so forth are realize by the analog circuit, before carrying out analog digital conversion so that remaining functions are processed in digital method, namely the processing is arranged by the method of compromise between the analog method and the digital method.

When LSI (Large Scale Integration) is constituted by the neuron-element in the conventional system, it is necessary to carry out learning in the neural network with respect to all kinds of subjects in every problem without difficulty. In order to realize flexible adaptation of the neural network as the LSI to the problem, it is desirable that respective neurons are capable of learning the subjects autonomously (referring to unsupervised learning system).

As the unsupervised learning method, Hebbian learning system and self-organizing map method et. al. are known. In the Hebbian learning method that competitive leaning between neurons in the same layer is carried out, some neurons in a group within the neural network are constituted in layered shape. Only one cell of neurons in the respective layers is permitted to be excitatory as the winner. As is clear from the conventional achievements that self-learning is capable according to a single-winner method, hereinafter called as winner-take-all method, due to competition between neurons in the same layer. In the self-organizing map method of Kohonen, a winner-take-all is selected. The learning is carried out regarding only the neurons adjacent to the winner. However, according to the winner-take-all method, it is necessary to provide the neurons for the number of items which are intended to classify to be extracted as the special feature, thus there is the problem that the number of the neurons of the output layer is dissipated.

On the other hand, the error back-propagation method denotes suitable learning efficiency as a supervised learning. The error back-propagation method obtains the different error between an output obtained from the presentation of an input signal and teacher signal expected as an output, before carrying out the learning while changing the weight of the intermediate hidden layer of the front stage, and the weights of the output layer so as to render the error small. The error back-propagation method does not require the winner-take-all method, therefore there is no problem of dissipation in connection with the number of the neurons. However, the error back-propagation method requires teacher signal, and requires complicated calculation for updating the weights at the time of learning, therefore, there is the problem that the circuit of the data processor of the neurons in case of making into the LSI become complicated.

There are disclosed "A Self-Organizing Neural Network Using Multi-Winners Competitive Procedure" and "Multi-Winners Self-Organizing Neural Network" by Gjiongtao HUANG and Masafumi HAGIWARA. The former is published in 1995 as the report of THE INSTITUTE OF ELECTRONICS, INFORMATION AND COMMUNICATION ENGINEERS (TECHNICAL PEPORT OF IEICE, NC 94–94 pp 43–150). The later is published in 1997 as the report of THE INSTITUTE OF ELECTRONICS, INFORMATION AND COMMUNICATION ENGINEERS (TECHNICAL PEPORT OF IEICE, NC 96–156 pp 7–14). These are the method for reducing the number of the neurons while permitting multi-layers. The multi-winners self-organizing neural network according to HUANG and HAGIWARA and so forth obtains the sum total of the output of the competitive layer at the time of updating learning of the weights. This neural network prevents dissipation and divergence of the weights while normalizing the output of the competitive layer by using the obtained the sum total. However complicated procedure is required for normalization in that the sum total of the output should be obtained, before normalizing respective output values with obtained the sum total, thus there is the problem that it causes the circuit of the neurons to be complicated at the time of making into the LSI.

SUMMARY OF THE INVENTION

In view of the foregoing, it is an object of the present invention, in order to overcome the above-mentioned problems, to provide a multi-winners feedforward neural network in which the neural network is constitute using neuron-element which is obtained while causing the neural network to be made into model, and which can carry out learning autonomously with respect to any problem, and which can be constituted by small number of LSI circuit simply.

According to a first aspect of the present invention, in order to achieve the above-mentioned objects, there is provided a multi-winners feedforward neural network in which a plurality of neurons constituting hierarchical structure of one layer and/or plural layers which neural network has a controller for controlling the number of firing of the neurons, in which the number of firing of the neurons is more than two, in such a way that the number of firing of the neurons is restrained depending on a specified value and/or range of the specified value in every layer.

Consequently, there are more than two pieces of neurons which are excited in respective layers, therefore, it is not necessary to carry out complicated processing of the well known winner-take-all method of one excited neuron. The multi-winner feedforward neural network of two neurons is capable of being realized simply on the ground that a threshold value is set in every respective layers for causing the neuron to be excited.

According to a second aspect of the present invention, in the first aspect, there is provided a multi-winners feedforward neural network, wherein the controller for controlling the number of firing of the neurons, in which the number of firing is more than two, in such a way that the way that the number firing of the neurons is restrained depending on a specified value and/or the range of the specified value in every layer, the controller has a detection controller for causing a value to be the specified value and/or the range of the specified value, depending on obtained value while detecting power supply current supplied to the whole neurons in every layer.

Consequently, power supply current supplied to the neuron of the layer concerned represents the number of firing of the neurons. The value obtained by detecting the current value is function-transformed to be carried out feedback, resulting in control of firing of the neuron of the layer concerned. Thus restriction of the number of firing of the neurons is restricted.

According to a third aspect of the present invention, in the first aspect, there is provided a multi-winners feedforward neural network, wherein the controller for controlling the number of firing of the neurons, in which time number of firing of the neurons is more than two, in such a way that the number of firing of the neuron is restrained depending on a specified value and/or range of the specified value in every layer, the controller comprises a detection controller for controlling the whole neurons of intermediate layer which neurons detect power supply current, causing a value to be the specified value and/or the range of the specified value, depending on obtained value while detecting power supply current supplied to the whole neurons in a plurality of layers of intermediate layer, and a detection controller for controlling the whole neurons of an output layer which neurons detect power supply current, causing a value to be the specified value and/or the range of the specified value, depending on obtained value while detecting power supply current supplied to the whole neurons in the output layer.

Consequently, power supply current supplied to the neuron of the intermediate layer represents the number of firing of the neurons. The current supplied to not only one layer of the intermediate layer but also a plurality of the layers is detected to be function-transformed together, subsequently, the value obtained is carried out feedback, thus controlling firing of the neuron of the layer concerned which detects power supply current of the intermediate layer. For this reason, restriction of the number of firing of the neuron is carried out regarding the neurons of a plurality of the intermediate layers simply.

According to a fourth aspect of the present invention, in the first aspect, there is provided a multi-winners feedforward neural network, wherein the controller for controlling the number of firing of the neurons, in which the number of firing of the neurons is more than two, in such a way that the number of firing of the neurons is restrained depending on a specified value and/or range of the specified value in every layer, the controller comprises a detection controller for controlling the whole neurons of an intermediate layer and an output layer which neurons detect power supply current, causing a value to be the specified value and/or the range of the specified value, depending on obtained value while detecting power supply current supplied to the whole neurons in the intermediate layer and the output layer.

Consequently, power supply current supplied to the neurons of the intermediate layer and the output layer represents the number of firing of the neurons within the intermediate layer and the output layer. The network causes the current value detected to be carried out feedback to control firing of the whole neurons of the intermediate layer and the output layer so that restriction of the number of firing of the neuron is carried out regarding the whole neurons of the intermediate layer and the output layer simply.

According to a fifth aspect of the present invention, in any of the first aspect to the fourth aspect, there is provided a multi-winners feedforward neural network, wherein the controller for controlling the number of firing of the neurons, in which the number of firing of the neurons is more than two, in such a way that the number of firing of the neurons is restrained depending on a specified value and/or range of the specified value in every layer, the controller comprises a detector for detecting power supply current value, a means for function-transforming the power supply current value detected, and a modifier for controlling so as to render the number of firing of the neuron excitatory and/or so as to render the number firing of the neuron inhibitory regarding the neurons of the respective layers depending on the value function-transformed.

Consequently, the detector for detecting current value, the means for function-transformation, and the modifier for controlling firing of the neurons are realized easily using respective well known simple semiconductor circuits.

According to a sixth aspect of the present invention, in the fifth aspect, there is provided a multi-winners feedforward neural network, wherein the modifier for controlling so as to render the number of firing excitatory and/or so as to render the number firing inhibitory regarding the neurons of the respective layers depending on the value of function-transformed, transformed the modifier comprises a means for controlling the number of firing in such a way that when the number of firing of the neurons in the respective layers is less than the required number, the means renders the number of firing of the neurons excitatory, while when the number of firing of the neurons in the respective layers is larger than the required number, the means renders the number of firing of the neurons inhibitory.

Consequently, excitation and inhibition of firing, for instance, is realized simply by combining output of the modifier as one of the weights which constitutes the neurons.

According to a seventh aspect of the present invention, in the fifth aspect, there is provided a multi-winners feedforward neural network, wherein a function of the means for function-transforming the power supply current value detected is a linear transform function and/or a non linear transform function.

Consequently, these linear transformation functions are realized simply by combination of a current mirror, an amplifier and an inversion circuit and so forth, further non linear transformation functions are realized simply by a non linear element which generates an exponential curve and a secondary curve.

According to an eighth aspect of the present invention, in the first aspect, there is provided a multi-winners feedforward neural network, wherein the controller for controlling the number of firing of the neurons, in which the number of firing of the neurons is more than two, in such a way that the number of firing of the neurons is restrained depending on a specified value and/or range of the specified value in every layer, the controller comprises a number of firing detection neuron for detecting the number of firing of the neurons in every layer, thus causing value of output of the number of firing detection neuron to be the specified value and/or the range of the specified value.

Consequently, the number of firing detection neuron receives the output from the whole neurons of the layer concerned, and detecting the number of firing of the neuron within the layer concerned, thus controlling firing of the neuron of the layer concerned.

According to a ninth aspect of the present invention, in the eighth aspect, there is provided a multi-winners feedforward neural network, wherein the number of firing detection neuron consists of a minimum value detection neuron for coping with the case where the number of firing of the neuron decreases to the value less than the minimum value of the specified range in every layer, and a maximum value detection neuron for coping with the case where the number of firing of the neuron exceeds the value larger than the maximum value of the specified range in every layer, in which the minimum value detection neuron renders firing of the neurons of the layer excitatory, and the maximum value detection neuron renders firing of the neurons of the layer inhibitory.

Consequently, the minimum value detection neuron receives the output from respective neurons of the layer concerned as the input, when the total-sum of the input is reached to the minimum value of the number of firing specified, the threshold value is set so as to change the output, resulting in detection of the minimum value. The maximum value detection neuron receives the output from respective neurons of the layer concerned as the input, when the total-sum of the input is reached to the maximum value of the number of firing specified, the threshold value is set so as to change the output, resulting in detection of the maximum value.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 1 is a view showing a first embodiment having a device constitution in connection with a configuration of enforcement 1;

DETAILED DESCRIPTION OF THE PREFERRED EMBODIMENTS

Figure 2:
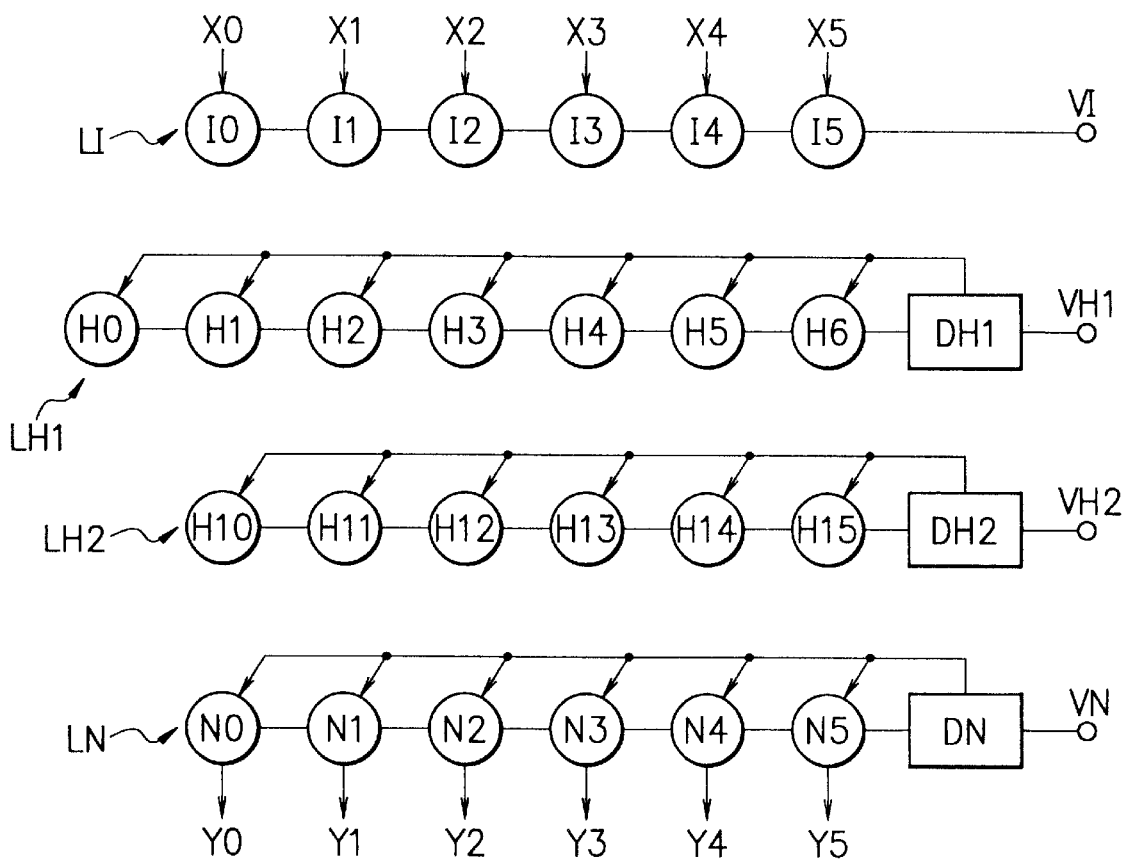
FIG. 2 is a view showing a second embodiment which detects to be controlled power supply current in connection with a configuration of enforcement 2.

A p referred embodiment of the present invention will be described in detail in accordance with the accompanying drawings which show the configuration of the enforcement.

[First Embodiment]

FIG. 1 is a view showing the first embodiment representing a constitution of a multi-winners feedforward neural network in connection with the configuration of enforcement 1 of the present invention.

The multi-winners feedforward neural network of the first embodiment is a neural network with three layers of hierarchical structure which consists of an input layer LI for receiving an input signal, an output layer for outputting the last firing, and an intermediate layer LH of one layer in this place as an intermediate layer.

The number of the neurons of the input layer LI depends on the number of the input signal. Here, six neurons I0 to I5 receive the input signals X0 to X5 respectively. Although it does not illustrated because the drawing becomes complicated, respective neurons I0 to I5 give the firings to the whole neurons H0 to H5 of the intermediate layer LH. The number of the neurons of the intermediate layer LH depends on the number of category to which recognition is carried out. Here, six neurons H0 to H5 constitute the intermediate layer. The respective neurons H0 to H5 receive the firings of the neurons I0 to I5 of the input layer LI of the front stage. The respective neurons H0 to H5 give the firings to the whole neurons of the output layer LN of the next stage. The number of the neurons of the output layer LN depends on the category to which recognition is carried out.

Here, six neurons of the output layer are the neurons N0 to N5. Respective neurons N0 to N5 of the output layer LN receive the firings of the neurons H0 to H5 of the intermediate layer LH of the front stage, thus outputting the last firings Y0 to Y5.

The neurons I0 to I5 of the input layer LI are driven by a power supply VI. The neurons H0 to H5 of the intermediate layer LH are driven by a power VH. The neurons N0 to N5 of the output layer LN are driven by a power supply VN. A controller C1 controls firing of the neurons H0 to H5, causing the number of firing of the neurons among the neurons H0 to H5 of the intermediate layer LH to be certain specified value and/or certain range of specified value. A controller C2 controls firing of the neurons N0 to N5, causing the number of firing of the neurons among the neurons N0 to N5 of the output layer LN to be certain specified value and/or certain range of specified value. Concretely, when the number of firing of the neurons is insufficient, the controllers C1, and C2 cause is put level to rise continuously for the neurons up to required number of while rendering respective neurons excitatory. Otherwise, the controllers C1, and C2 cause threshold value for rendering the number of firing excitatory to fall continuously up to required number of firing of the neurons. Namely, the later way is to raise input level for the neurons equivalently.

Here there are plural number of firing of the neurons in respective layers. Therefore, it is sufficient that the number of the neurons in respective layers is smaller number in comparison with the number of category to be recognized. In an ideal state, for instance, it is capable of being recognized 2 to the sixth power, namely 64 categories by six neurons because of coding the category. However, the order of 16 is desirable for the number of category when adaptivity and/or robustness of the neural network is considered.

[Second Embodiment]

FIG. 2 is a view showing the second embodiment as the multi-winners feedforward neural network in connection with a configuration of enforcement 2. There is provided a controller in which the number of firing of the neurons is equal to or larger than two, which controller controls the number of firing of the neuron in such a way that the controller controls so as to be restrained according to the specified value and/or the range of the specified value dependently in every layer concerned. The controller, concretely, controls the number of firing of the neurons while detecting value of power supply current of the layer concerned, which power supply current is supplied to the neuron-element. In the second embodiment, the multi-winners feedforward neural network consists of one layer of an input layer LI, one layer of an output layer LN, and two layers of intermediate layers LH1, and LH2. Respective layers are driven by power supplies VI, VN, VH1, and VH2. The first intermediate layer LH1 is constituted by seven neurons H0 to H6. The second intermediate layer LH2 is constituted by six neurons H10 to H15. Thus the number of the neurons in respective intermediate layers is determined appropriately according to the recognition object.

Current is supplied to the whole neurons of the first intermediate layer LH1 from the power supply VH1. The current value is detected by a detection controller DH1. The detection controller DH1 controls firing of the neurons H0 to H6 of the first intermediate layer LH1 depending on the detected current value. Current is supplied to the whole neurons of the second intermediate layer LH2 from the power supply VH2. The current value is detected by a detection controller DH2. The detection controller DH2 controls firing of the neurons H10 to H15 of the second intermediate layer LH2 depending on the detected current value. Current is supplied to the neurons N0 to N5 of the output layer LN from the power supply VN. The current value is detected by a detection controller DN. The detection controller DN controls firing of the whole neurons N0 to N5 of the output layer LN depending on the detected current value.

Also in the second embodiment, connections between respective layers from the input layer to the output layer are omitted for the sake of object which is to be easy to see. When the number of the neurons is small number as the configuration of the enforcement 2, the whole connection constitution is applied between respective layers, namely, outputs of the respective neurons of the front stage are connected in parallel to the whole neurons of the later stage.

[Third Embodiment]

Figure 3:
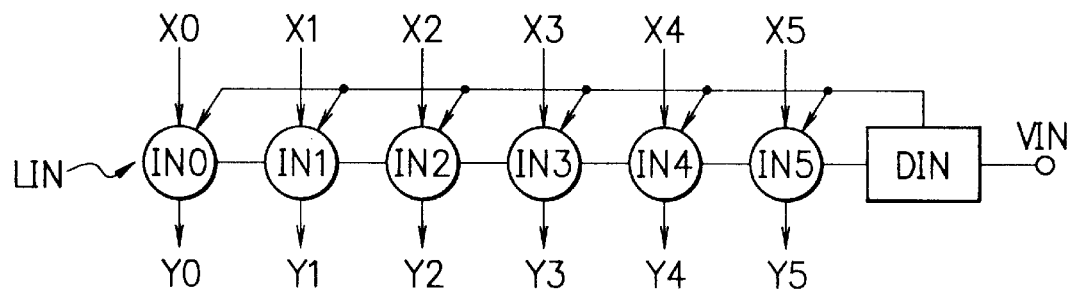
FIG. 3 is a view showing a third embodiment having one layer of a recurrent type constitution as a second network which detects to be controlled power supply current in connection with the configuration of enforcement 2.

FIG. 3 is a view showing the third embodiment as the second multi-winners feedforward neural network in connection with the configuration of the enforcement 2. There is provided a controller in which the number of firing of the neurons is equal to or larger than two, which controller controls the number of firing of the neuron in such a way that the controller controls so as to be restrained according to the specified value and/or the range of the specified value dependently in every layer concerned. The controller, concretely, controls the number of firing of the neurons while detecting value of power supply current of the layer concerned, which power supply current is supplied to the neuron-element. In the third embodiment, there is no intermediate layer, and an input layer and an output layer are combined into one layer LIN.

The Neurons IN0 to IN5 of one layer of the LIN layer are driven by a power supply VIN. The neurons IN0 to IN5 receive input signals X0 to X5, before outputting firings Y0 to Y5. The firings Y0 to Y5 as being the last firings are inputted again to respective six neurons IN0 to IN5 of the LIN layer. Thus the neurons IN0 to IN5 recognize input signal while being constituted into recurrent type configuration. The power supply current is supplied to the whole neurons IN0 to IN5 of the LIN layer from the power supply VIN. The current value of the power supply current is detected y a detection controller DIN. The detection controller DIN controls firing of the neurons IN0 to IN5 of the LIN layer depending on the detected current value.

[Fourth Embodiment]

Figure 4:
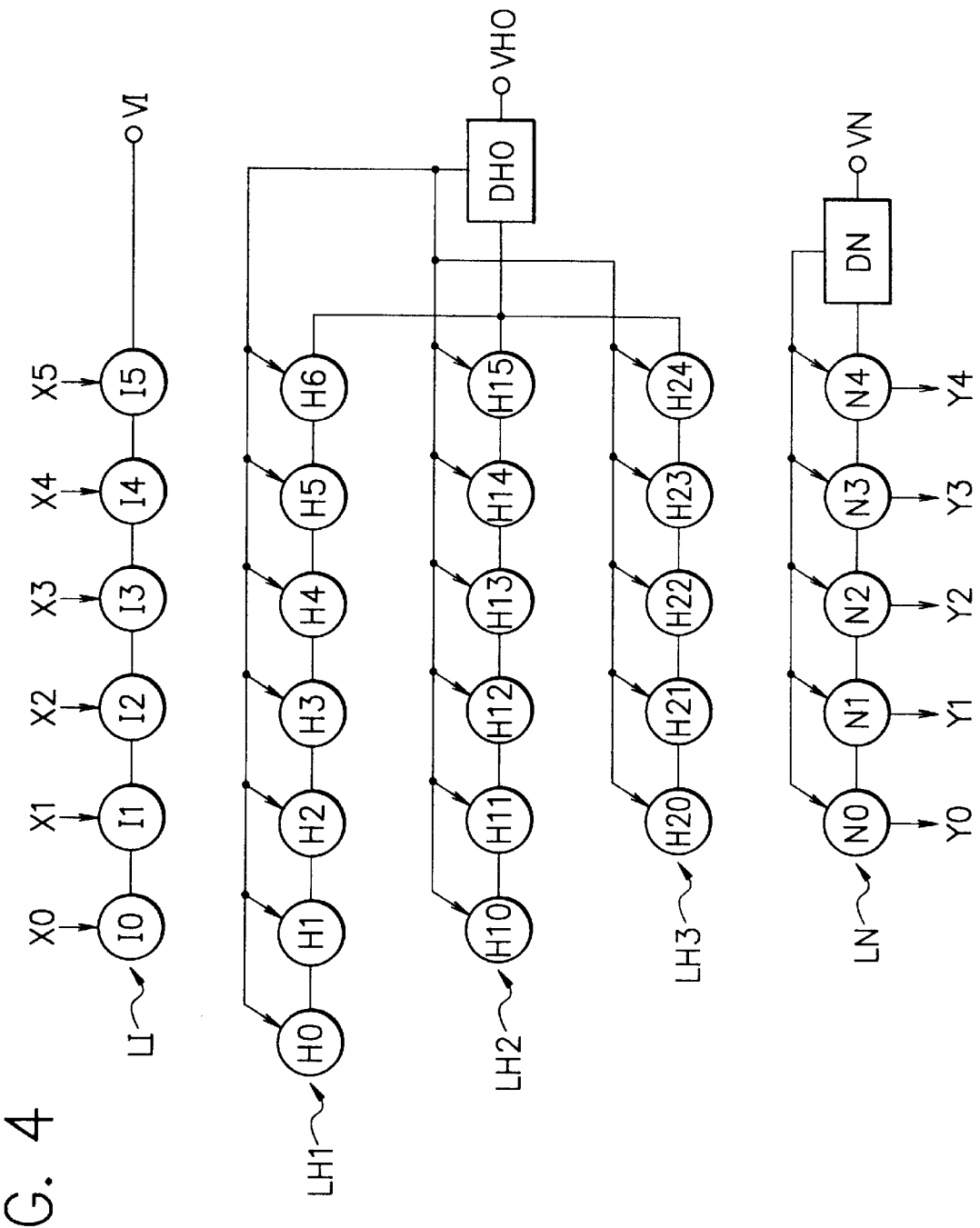
FIG. 4 is a view showing a fourth embodiment which detects to be controlled neurons of intermediate layer of a plurality of layers together in connection with a configuration of enforcement 3.

FIG. 4 is a view showing the constitution of the fourth embodiment as a multi-winners feedforward neural network of a configuration of enforcement 3. The multi-winners feedforward neural network of the present embodiment includes a detection controller which controls the neurons plural layers of intermediate layer based on the specified value and/or the range of the specified value. The detection controller detects together power supply current supplied to the neurons of a plurality of intermediate layers. Thus the value depending on a value obtained by detecting a power supply current supplied to the neurons of the plurality of the intermediate layers is taken to be the specified value and/or the range of the specified value. The output layer is controlled by the same method as that of the above second embodiment.

Current is supplied to the whole neurons H0 to H6, H10 to H15, and H20 to H24 of the whole layers LH1 to LH3 of the intermediate layers from a power supply VH0. The current value thereof is detected by a detection controller DH0. The detection controller DH0 controls commonly firing of the whole neurons H0 to H24 of the whole intermediate layers LH1 to LH3 depending on the detected current value. Current is supplied to the whole neurons N0 to N4 of the output layer LN from a power supply VN. The current value thereof is also detected by a detection controller DN. The detection controller DN controls firing of the whole neurons N0 to N4 of the output layer LN depending on the detected current value. The number of the neurons of respective layers of intermediate layer and output layer is capable of being changed according to the object.

[Fifth Embodiment]

Figure 5:
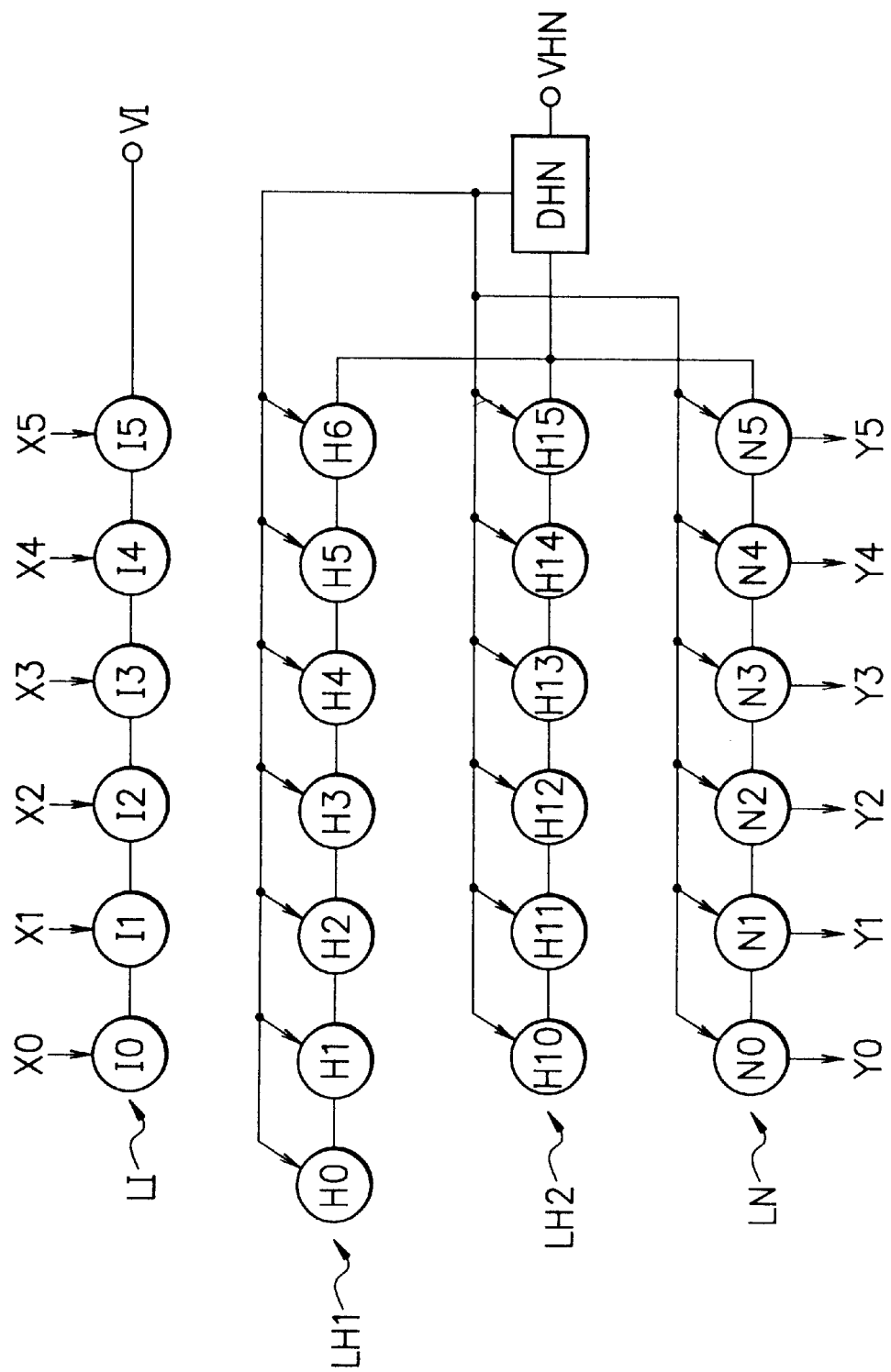
FIG. 5 is a view showing a fifth embodiment which detects to be controlled power supply current of the whole neurons of intermediate layer and output layer in connection with a configuration of enforcement 4.

FIG. 5 is a view showing a constitution of the fifth embodiment as a multi-winners feedforward neural network in connection with a configuration of an enforcement 4. The multi-winners feedforward neural network of the present embodiment has a detection controller which controls the whole neurons of an intermediate layer and an output layer in accordance with the specified value and/or the range of the specified value. The value depending on current value obtained together by detecting power supply current supplied to the whole neurons of the intermediate layer and the output layer is taken to be the specified value and/or the range of the specified value. In the multi-winners feedforward neural network of the present embodiment, the intermediate layer consists of two layers LH1, and LH2. A first intermediate layer LH1 is constituted by seven neurons H0 to H6. A second intermediate layer LH2 is constituted by six neurons H10 to H15.

Current is supplied to the neurons H0 to H6, and the neurons H10 to H15 of the whole layers LH1 to LH2 of the intermediate layer and the whole neurons N0 to N5 of the output layer LN from a power supply VHN. The current value thereof is detected by a common detection controller DHN. The detection controller DHN controls commonly firing of the neurons H0 H6, H10 to H15 of the whole layers LH1, LH2 of the intermediate layer and firing of the neurons N0 to N5 of the output layer LN depending on the detected current value.

[Sixth Embodiment]

Figure 6:
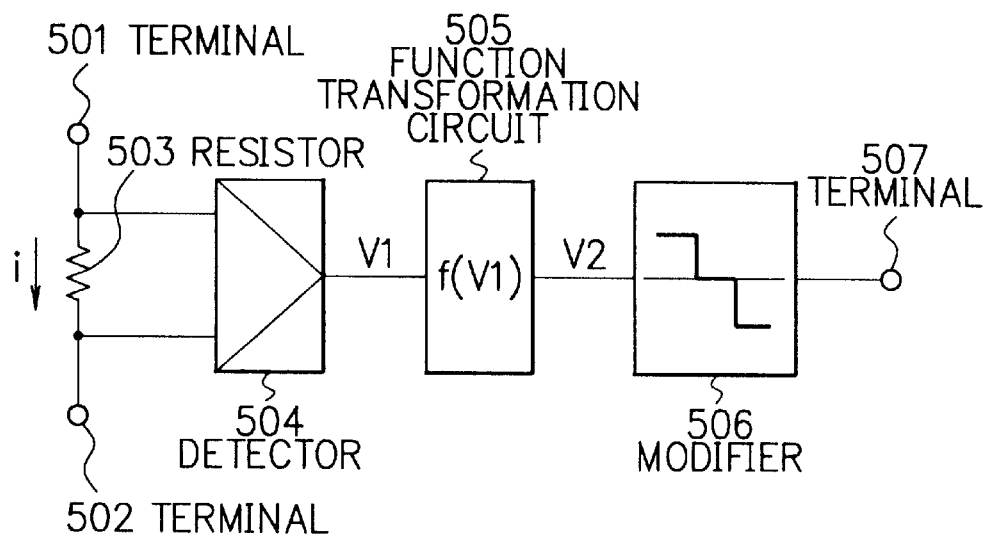
FIG. 6 is a view showing a sixth embodiment which represents constitution of controller for controlling so as to cause the number of firing of the neurons to be the specified value and/or the range of the specified value in connection with a configuration of enforcement 5.

FIG. 6 is a view showing a constitution of a six embodiment as a multi-winner feedforward neural network in connection with a form of a enforcement 5. There is provided a controller controls the number of firing of the neurons within the layer concerned so as to be restrained according to the specified value and/or the range of the specified value dependently. The controller comprises a detection means for detecting power supply current value, a means for function-transforming the detected current value, and a modifier for controlling firing of the neurons of the layer concerned so as to be excitatory or so as to be inhibitory depending on the value function-transformed. A means for controlling the number of firing of the neurons comprises a detector 504 for detecting power supply current value, a function transformation means 505 for function-transforming the detected current value, and a modifier 506 for controlling as to render firing of the neurons of respective layers excitatory, or so as to render firing of the neurons of respective layers inhibitory within the range S1 to S2 of the value which is prescribed by the function-transformed value.

A terminal 501 is connected to the power supply. A terminal 502 is connected the neurons in the layer concerned. A resistor 503 intervenes between these terminals 501 and 502. The detector 504 detects voltage of both sides of the resistor 503 so that detector 504 detects the power supply current "i". The output voltage V1 which is obtained while detecting the power supply current i is inputted to the function-transformation means 505. The function-transformation means 505 carries out required function-transformation of linear function-transformation, and/or non-linear function-transformation, thus being obtained an output V2. The output V2 is inputted to the modifier 506. When the output V2 is smaller than the minimum value S1 which is the minimum value of the range of the specified value, the modifier 506 fires positive output for rendering firing of the neurons excitatory to the terminal 507. While when the output V2 is larger than the maximum value S2 which is the maximum value of the range of the specified value, the modifier 506 fires negative output for rendering firing of the neurons inhibitory to the terminal 507.

The respective neurons, as shown in the configuration of enforcement 5, function such that the neurons fire the firing while rendering firing excitatory when the respective neurons receive the positive output from the terminal 507. The operation in general is the method that it permits the output of the terminal 507 to combine to respective neurons with positive weights as is performed in the convention method. When respective neurons receive negative output from the terminal 507, firing of the neurons is inhibited because the product of the weights and the negative output therebetween become negative value. Namely, when the output of the terminal 507 is negative, the connection to the neurons functions as inhibitory connection equivalently.

[Seventh Embodiment]

Figure 7:
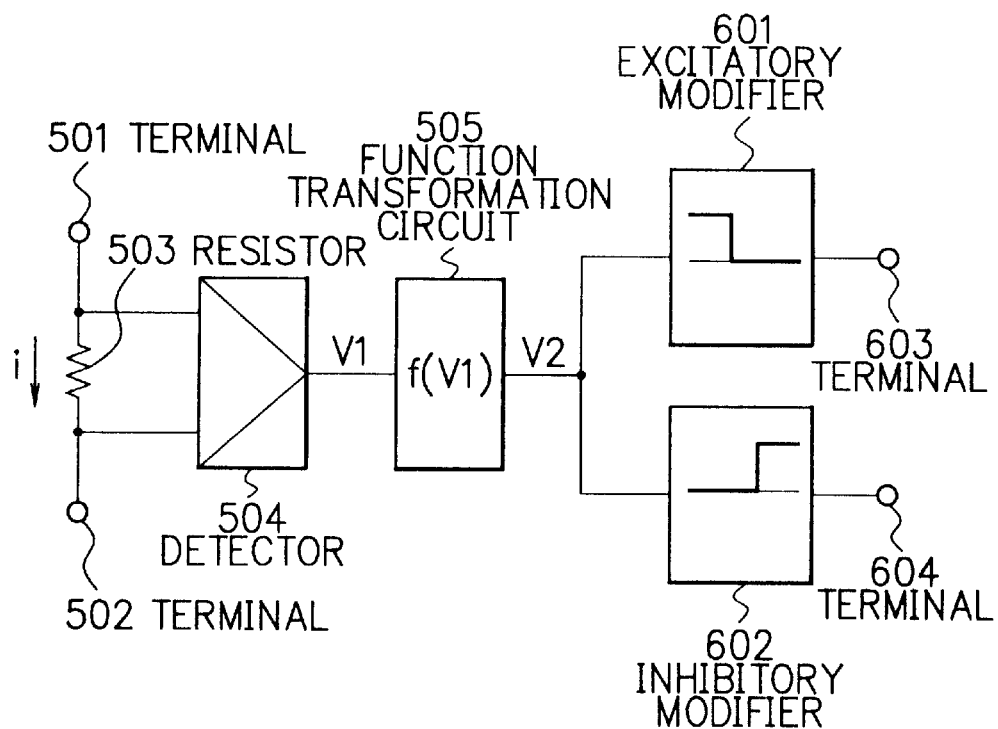
FIG. 7 is a view showing a seventh embodiment provided with excitatory modifier and inhibitory modifier as a second constitution in which the excitatory modifier has an excitatory combination, and the inhibitory modifier has an inhibitory combination in connection with a configuration of enforcement 6.

FIG. 7 is a view showing a constitution of a seventh embodiment as a multi-winners feedforward neural network in connection with a configuration of enforcement 6. The modifier 506 of the sixth embodiment shown in FIG. 6 is constituted by a connection means which comprises an excitatory modifier 601 rendering firing of the neurons excitatory with positive product regarding the weights, and an inhibitory modifier 602 rendering firing of the neurons inhibitory.

The excitatory modifier 601 constitutes an excitatory coupling from the terminal 603 to respective neurons, and the inhibitory modifier 602 constitutes an inhibitory coupling from the terminal 604 to respective neurons. As shown in the configuration of enforcement 6, the excitatory coupling functions so as to render firing of the neurons excitatory when signal is entered. While the inhibitory coupling functions so as to render firing of the neurons inhibitory when signal is entered.

[Eighth Embodiment]

Figure 8:
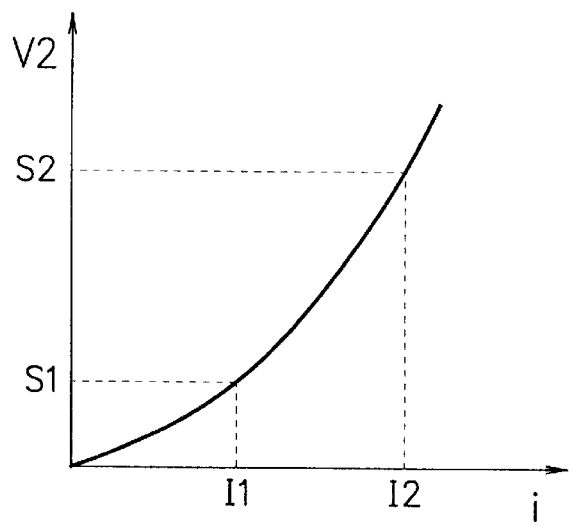
FIG. 8 is a view showing an eighth embodiment which shows function value of a function-transformation circuit when it causes the number of firing of the neuron to be the specified value or to be the range of the specified value in connection with a configuration of enforcement 7.

FIG. 8 is a view showing an eighth embodiment which represents concretely a configuration of a function of means for function-transforming regarding the multi-winners feedforward neural network in connection with a configuration of enforcement 7. Range of the specified value is represented by range of power supply current I1 to I2 which corresponds to range S1 to S2 or values S1, and S2 for controlling the number of firing of the neurons as the range of the specified value. Namely, the number of firing of the neurons is controlled within the range. The transform function is defined as linear function or designed exponential function or secondary function or the like within the range of power supply current I1 to I2. Value of the function according to the power supply current without the range I1 to I2 does not influence operation of the neural network.

[Ninth Embodiment]

Figure 9:
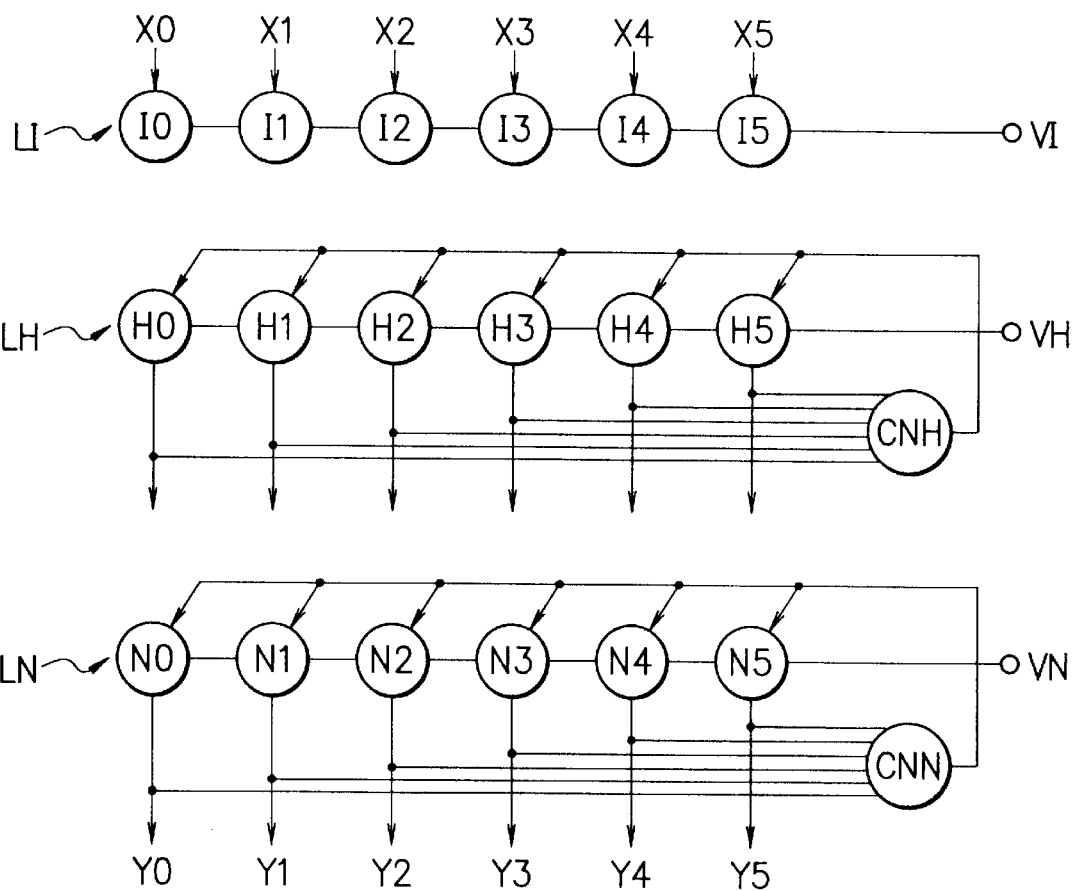
FIG. 9 is a view showing a ninth embodiment in which there is provided the number of firing detection neuron for detecting the number of firing of the neuron in every layer concerned, thus controlling the number of firing of the neuron by the output thereof.

FIG. 9 is a view showing a ninth embodiment as a multi-winners feedforward neural network in connection with a configuration of enforcement 8. There is provided a number of firing detection neuron for detecting the number of firing of the neurons in every layer concerned. The number of firing detection neuron is the means for controlling so as to cause the number of firing of the neurons to be restrained depending on the specified value and/or range of the specified value in every layer concerned, similar to the first embodiment. The number of firing detection neuron enables the number of firing of the neurons to be restrained to the specified value or within the range of the specified value.

The multi-winners feedforward neural network of the ninth embodiment is a neural network with three layers of hierarchical consisting of an input layer LI for receiving input signal, an output layer LN for outputting the last firing, and one layer of intermediate layer LH as an intermediate layer. The respective layers are driven by power supplies VI, VN, and VH. The constitution of the input layer is identical with the second embodiment. The intermediate layer LH is constituted by six neurons H0 to H5. The output layer LN is constituted by neurons N0 to N5. Although it is not illustrated in the drawing, firings from the whole neurons of the input layer LI are connected to input of respective neurons of the intermediate layer as being the same way as the second embodiment. The firings from respective neurons of the intermediate layer are combined to the whole neurons of the output layer. The number of the neurons of respective layers of the intermediate layer and the output layer are determined appropriately according to the recognition object as described above.

The number of firing detection neuron CNH uses output from respective neurons H0 to H5 of the intermediate layer LH to be input. The number of firing detection neuron CNH, when the number of firing of the neurons is smaller than the minimum value specified beforehand in the intermediate layer, causes positive output to be carried out. The number of firing detection neuron CNH, when the number of firing of the neurons is larger than the maximum value specified beforehand in the intermediate layer, causes negative output to be carried out. The number of firing neuron CNH, when the number of firing of the neurons is within the range of the specified value specified beforehand in the intermediate layer, cause output of zero (0) to be carried out. As a result, the neurons H0 to H5 which receive the output of the number of firing detection neuron CNH within the intermediate layer LH, when receiving the positive output, rendering firing of the neuron excitatory, when receiving the negative output, rendering firing of the neuron inhibitory, and when receiving the zero-output, causing no firing of the neurons to be carried out. According to the above operation, control of the number of firing of the neurons of the intermediate layer is carried out.

The number of firing detection neuron CNN uses output from respective neurons N0 to N5 of the output layer LN to be input. The number of firing detection neuron CNN as being the same way as the number of firing detection neuron CNH, when the number of firing of the neurons is smaller than the minimum value specified beforehand in the output layer, causes positive output to be carried out. The number of firing detection neuron CNN, when the number of firing of the neurons is larger than the maximum value specified beforehand in the output layer, causes negative output to be carried out. The number of firing neuron CNN, when the number of firing of the neurons is within the range of the specified value specified beforehand in the output layer, causes output of zero (0) to e carried out. As a result, the neurons N0 to N5 which receive the output of the number of firing detection neuron CNN within the output layer LN, when receiving the positive output, rendering firing of the neuron excitatory, when receiving the negative output, rendering firing of the neuron inhibitory, and when receiving the zero-output, causing no firing of the neurons to be carried out.

According to the above operation, control of the number of firing of the neurons of the output layer is carried out. The number of firing detection neurons CNH, and CNN are capable of being constituted by the same neuron-element as being used in the intermediate layer and/or the output layer.

Also in the ninth embodiment, connections between respective layers from the input layer to the output layer are omitted for the sake of object which is to be easy to see. When the number of the neurons is small number as the embodiment 9, the whole connection constitution is applied between respective layers, namely, outputs of the respective neurons of the front stage are connected in parallel to the whole neurons of the later stage.

[Tenth Embodiment]

Figure 10:
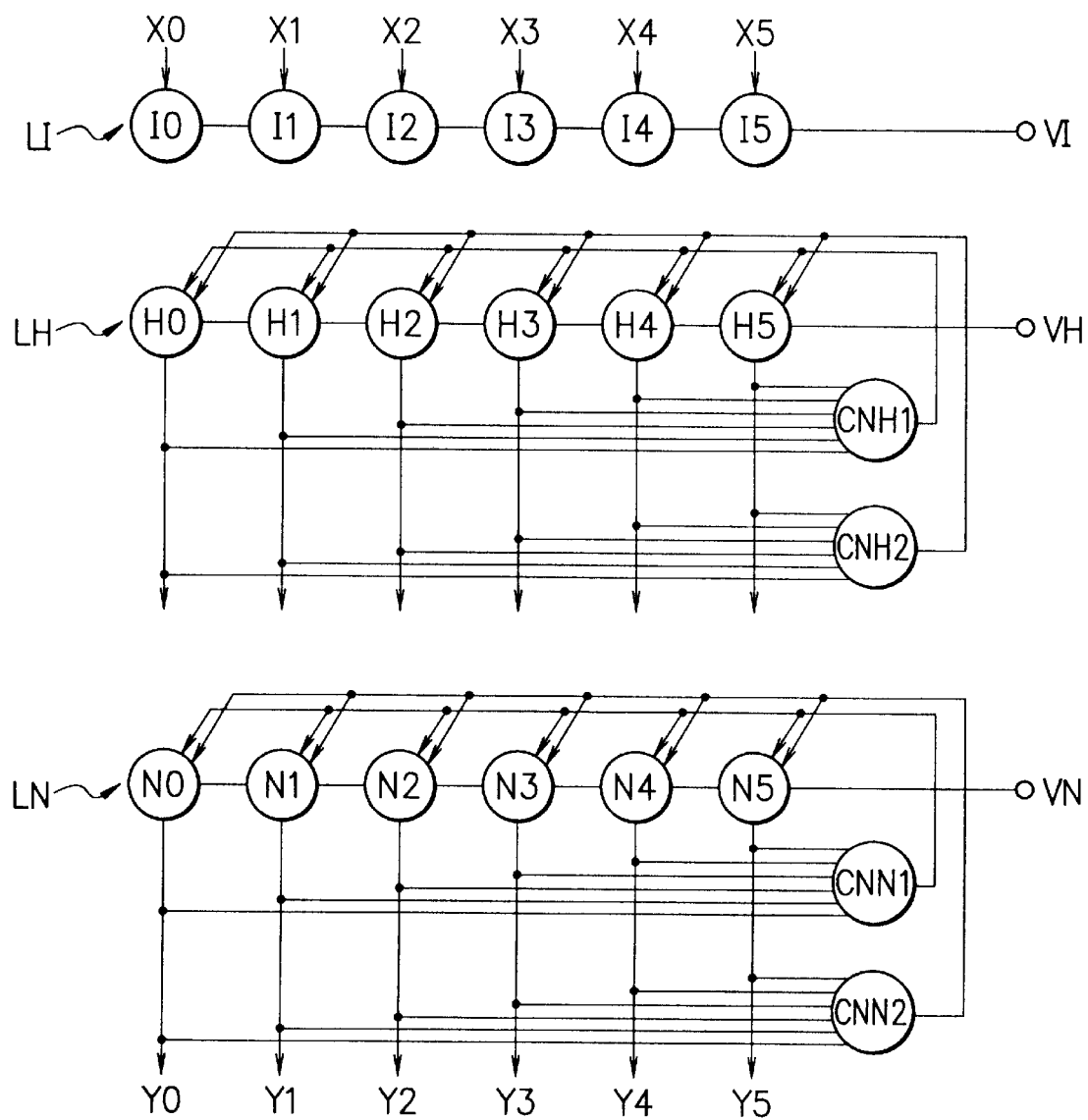
FIG. 10 is a view showing a tenth embodiment in which the number of firing detection neuron of the configuration of enforcement 8 is constituted by the minimum value detection neuron and the maximum value detention neuron in connection with a configuration of enforcement 9.

FIG. 10 is a view showing a tenth embodiment as a multi-winners feedforward neural network in connection with a configuration of enforcement 9.

The number of firing detection neuron shown in the ninth embodiment, in the tenth embodiment, consists of a minimum value detection neuron for coping with the state where the number of firing is less than the minimum value of the range specified in every layer concerned and a maximum value detection neuron for coping with the state where the number of firing exceeds the maximum value of the range specified in every layer concerned. The minimum value detection neuron renders firing of the neurons of the layer concerned excitatory. The maximum value detection neuron renders firing of the neurons of the layer concerned inhibitory.

The multi-winners feedforward neural network of the tenth embodiment which is identical with the ninth embodiment, is a neural network with three layers of hierarchical structure consisting of an input layer LI for receiving input signal, an output layer LN for outputting the last firing, and one layer of intermediate layer LH as an intermediate layer. The respective layers are driven by power supplies VI, VN, and VH. The constitution of the input layer is identical with the second embodiment and/or the ninth embodiment. The intermediate layer LH is constituted by six neurons H0 to H5. The output layer LN is constituted by six neurons N0 to N5. Although it is not illustrated in the drawing, firings from the whole neurons of the input layer LI are combined with input of respective neurons of the intermediate layer as being the same way as the second embodiment. The firings from respective neurons of the intermediate layer are combined with the whole neurons of the output layer. The number of the neurons of respective layers of the intermediate layer, and the output layer is determined appropriately according to the recognition object as described above.

The minimum value detection neuron CNH1 and the maximum value detect on neuron CNH2 use firing from respective neurons H0 to H5 of the is intermediate layer LH to be input. The minimum value detection neuron CNH1, when the number of firing of the neurons is smaller than the minimum value specified beforehand in the intermediate layer, causes positive output to be carried out. With the exception f the above case, the minimum value detection neuron CNH1 causes zero-output to be carried out. The maximum value detection neuron CNH2, when the number of firing of the neurons is larger than the maximum value specified beforehand in the intermediate layer, causes negative output to be carried out. With the exception of the above case, the maximum value detection neuron CNH2 causes zero-output to be carried out. There is provided an excitatory combination between the output of the minimum value detection neuron CNH1 and the neurons H0 to H5 of e intermediate layer LH. There is provided an inhibitory combination between the output of the maximum value detection neuron CNH2 and the neurons H0 to H5 of the intermediate layer LH. As a result, the neuron H0 to H5 which receive the output of the minimum value detection neuron CNH1 within the intermediate layer LH, when receiving the output thereof, rendering firing of the neuron excitatory, the neurons H0 to H5 which receive the output of the maximum value detection neuron CNH2 within the intermediate layer LH, when receiving the output thereof, rendering firing of the neuron inhibitory. When the minimum value detection neuron CNH1 and the maximum value detection neuron CNH2 cause zero-output to be carried out to the neurons H0 to H5 within the intermediate layer LH, firing of the neurons within the intermediate layer is not influenced at all. According to the above opera ion, control of the number of firing of the neurons of the intermediate layer is carried out.

The minimum value detection neuron CNN1 and the maximum value detect on neuron CNN2 use firing from respective neurons N0 to N5 of the output layer LN to be input. The minimum value detection neuron CNN1, when the number of firing of the neurons is smaller than the minimum value specified beforehand in the output layer, causes positive output to be carried out. With the exception of the above case, the minimum value detection neuron CNN1 causes zero-output to be carried out. The maximum value detection neuron CNN2, when the number of firing of the neurons is larger than the maximum value specified beforehand in the output layer, causes negative output to be carried out. With the exception of the above case, the maximum value detection neuron CNN2 causes zero-output to be carried out. There is provided an excitatory combination between the output of the minimum value detection neuron CNN1 and the neurons N0 to N5 of the output layer LN. There is provided an inhibitory combination between the output of the maximum value detection neuron CNN2 and the neurons N0 to N5 of the output layer LN. As a result, the neurons N0 to N5 which receive the output of the minimum value detection neuron CNN1 within the output layer LN, when receiving the output thereof, rendering firing of the neuron excitatory; the neurons N0 to N5 which receive the output of the maximum value detection neuron CNN2 within the output layer LN, when receiving the output thereof, rendering firing of the neuron inhibitory. When the minimum value detection neuron CNN1 and the maximum value detection neuron CNN2 cause zero-output to be carried out to the neurons N0 to N5 within the output layer LN, firing of the neurons within the output layer is not influenced at all. According to the above operation, control of the number of firing of the neurons of the output layer is carried out.

The minimum value detection neurons CNH1, CNN1 of the intermediate layer and the output layer and the maximum value detection neurons CNH2, CNN2 of the intermediate layer and the output layer are capable of being constituted by the same neuron-element as being used in the intermediate layer and/or the output layer.

Also in the tenth embodiment, connections between respective layers from the input layer to the output layer are omitted for the sake of object which is to be easy to see. When the number of the neurons is small number a the tenth embodiment, the whole connection constitution is applied between respective layers, namely, outputs of the respective neurons of the front stage are connected in parallel to the whole neurons of the late stage.

[Another Embodiment]

With the exception of the first embodiment to the fifth embodiment shown in FIGS. 1 to 5, another various kinds of constitutions are executed as the present invention in that the recurrent type network shown in FIG. 3 as the third embodiment is piled up more than two layers, the recurrent type network is combined with the feedforward type network such as the first embodiment to the fifth embodiment shown in FIGS. 1 to 5, and so forth.

Furthermore, with the exception of the ninth embodiment to the tenth embodiment shown in FIGS. 9 to 10, another various kinds of constitutions are executed as the present invention in that the recurrent type network shown in FIG. 3 as the third embodiment, and/or the recurrent the network is piled up more than two layers, the recurrent type network is combined with the feedforward type network such as the first embodiment to the fifth embodiment shown in FIGS. 1 to 5, and so forth.

As described above, according to a present invention, in the neural network which consists of a plurality of layers at least more than one layer, the neural network causes the number of firing of the neurons to be more than two pieces in the competitive layers, so that it is capable of being increased the number of category capable of recognizing, so that it is capable a being reduced the number of neurons into the number capable of making into LSI while preventing divergence of necessary number of the neurons, thus the neural network causes the number of firing of the neurons to be controlled so as to agree with the specified value or so as to enter within the range of the specified value so that it is capable of being simplified the constitution and the operation of the system consisting of the neural network as well as it is capable of being simplified the circuit constituting the neural network.

While preferred embodiments of the invention have been described using specific terms, the description has been for illustrative purpose only, and it is to be understood that changes and variations may be made without departing from the spirit or scope of the following claims.

What I claimed is:

1. A multi-winners feedforward neural network that includes a neural network having, a plurality of neurons in a hierarchical structure with one of a single layer and plural layers, having a single input means, comprising:

a controller at each of said one of said single layer and said plural layers, for controlling a number of firing of said neurons to be equal to or more than two, and to be a range of values specified for each of said layers.

2. The multi-winners feedforward neural network as claimed in, claim 1, wherein said controller for controlling the number of firing of said neurons to be equal to or more than two, and to be said range of values specified for each of said layers, takes a value depending on the value obtained by detecting a power supply current supplied to the neurons in each of said layer as said specified range of values.

3. The multi-winners feedforward neural network as claimed in claim 1, said controller comprising:

a means for controlling the neurons o f a group of plural layers that detect a power supply current, while taking a value depending on the value obtained by detecting a power supply current supplied the neurons in said group of plural layers as said specified range of values.

4. The multi-winners feedforward neural network as claimed in claim 1, wherein said controller for controlling the number of firing of said neurons to be equal to or more than two, and to be said range of values specified for each of said layers, controls the whole neurons of all of said layers while taking a value depending on the value obtained by detecting a power supply current supplied to the neurons in the entire layers as said specified range of values.

5. The multi-winners feedforward neural network as claimed in claim 1, wherein said controller for controlling the number of firing of said neurons to be equal to or more than two, an to be said range of values specified for each of said layers , comprises:
   a detector for detecting a power supply current value;
   a means for function-transforming said detected power supply current value; and
   a modifier for controlling a number of firing excitatory neurons and/or a number of firing inhibitory neurons of said respective layers based on the function-transformed power supply current value.

6. The multi-winners feedforward neural network as claimed in claim 2, wherein said controller for controlling the number of firing of said neurons to be equal to or more than two, and to be a range of values specified for each of said layers, comprises:
   a detector for detecting a power supply current value;
   a means for function-transforming said detected power supply current value; and
   a modifier for controlling a number of firing excitatory neurons and/or a number of firing inhibitory neurons of said respective layers depending on the function-transformed power supply current value.

7. The multi-winners feedforward neural network as claimed in claim 3, wherein said controller for controlling the number of firing of said neurons to be equal to or more than two, and to be said range of values specified for each of said layers, comprises:
   a detector for detecting a power supply current value;
   a means for function-transforming said detected power supply current value; and
   a modifier for controlling a number of firing excitatory neurons and/or a number of firing inhibitory neurons of said respective layers depending on the function-transformed power supply current value.

8. The multi-winners feedforward neural network as claimed in claim 4, wherein said controller for controlling the number of firing of said neurons to be equal to or more than two, and to be said range of values specified for each of said layers, comprises:
   a detector for detecting a power supply current value;
   a means of function-transforming said detected power supply current value; and
   a modifier for controlling a number of firing excitatory neurons and/or a number of firing inhibitory neurons of said respective layers depending on the function-transformed power supply current value.

9. The multi-winners feedforward neural network as claimed in claim 5, said modifier comprising:
   a means for controlling the number of firing of said neurons so that when the number of firing of the neurons in said respective layers is less than the required number, said means renders the number of firing of the neurons excitatory, and when the number of firing of the neurons in said respective layers is larger than the required number, said means renders the number of firing of the neurons inhibitory.

10. The multi-winners feedforward neural network as claimed in claim 5, wherein a function of said means for function-transforming said detected power supply current value is a linear transform function and/or a non-linear transform function.

11. The multi-winners feedforward neural network as claimed in claim 1, wherein said controller for controlling the number of firing of said neurons to be equal to or more than two, an to be a range of values specified for each of said layers, takes a number of firing detection neuron for detecting the number of firing of the neurons in each of said layers to cause a value of firing of said number of firing detection neuron to be the specified range of values.

12. The multi-winners feedforward neural network as claimed in claim 11, wherein said number of firing detection neuron comprises:
   a minimum value detection neuron for when said number of firing of the neurons decreases to a value less than the minimum value of the specified range of values in each of said respective layers; and
   a maximum value detection neuron for when said number of firing of the neuron exceeds the value larger than the maximum value of the specified range of values in each of said respective layers wherein said minimum value detection neuron renders firing of all of the neurons of said layer excitatory, and said maximum value detection neuron renders firing of all of the neurons of said layer inhibitory.

13. The multi-winners feedforward neural network of claim 1, wherein a number of said neurons is an input layer equals a number of input signals.

14. The multi-winners feedforward neural network of claim 1, wherein a number of neurons in on of an output layer and an intermediate layer corresponds to a number of categories of recognition.

15. A multi-winners feed-forward neural network, comprising:
   an input layer that is coupled to a first power supply and has a plurality of neurons corresponding to a number of inputs;
   an intermediate layer that is coupled to a second power supply and a first controller, and has a plurality of neurons corresponding to a number of categories of recognition, said intermediate layer receiving a first firing from said input layer; and
   an output layer that is coupled to a third power supply and a second controller, and has a plurality of neurons corresponding to said number of categories of recognition, said output layer generating a plurality of outputs based on a second firing received from said intermediate layer.

16. The neural network of claim 15, wherein said first controller controls firing of said intermediate layer and said second controller controls firing of said output layer.

17. The neural network of claim 16, wherein said first controller and said second controller respectively control firings of said intermediate layer and said output layer based on respective power supply currents of said second power supply and said third power supply.

18. A multi-winners feedforward neural network that includes a neural network having a plurality of neurons constituting a hierarchical structure with one of a single layer and plural layers, comprising:
   a controller at each of said one of said single layer and said plural layers, that controls a number of firing of said neurons, in which the number of firing of the neurons is more than two, such that the number of firing of said neurons is restrained based on a specified value and/or a range of said specified value in each of said respective layers.

19. The multi-winners feedforward neural network of claim 1, said controller comprising:

a first detection controller that controls the neurons of intermediate layers that detect a power supply current, said first detection controller causing a value to be said specified value and/or said range of the specified value, based on the obtained value while detecting a power supply current supplied to the neurons in a plurality of layers of said intermediate layers; and a second detection controller that controls the neurons of an output layer that detect power supply current, said second detection controller causing a value to be said specified value and/or to be said range of the specified value, depending on the obtained value while detecting a power supply current supplied to the neurons in said output layer.

20. The multi-winners feedforward neural network as claimed in claim 1, said controller comprising:

a detector that detects a power supply current value;

a function transformer that function-transforms said detected power supply current value; and a modified that controls a number of firing excitatory neurons and/or a number of firing inhibitory neurons of said respective layers based on the function-transformed power supply current value.

* * * * *